United States Patent [19]

Gorjup et al.

[11] Patent Number: 4,814,006
[45] Date of Patent: Mar. 21, 1989

[54] MAKING OF STEEL

[75] Inventors: Johann Gorjup; Fritz P. Pleschiutschnigg, both of Duisburg; Joachim von Schnakenburg, Kempen, all of Fed. Rep. of Germany

[73] Assignee: Mannesmann AG, Duesseldorf, Fed. Rep. of Germany

[21] Appl. No.: 636,178

[22] Filed: Jul. 31, 1984

[51] Int. Cl.$^4$ .................................................. C21C 7/00
[52] U.S. Cl. ...................................... 75/59.12; 75/46; 266/135; 266/142; 266/243
[58] Field of Search ............... 75/46, 60, 51; 266/135, 266/243, 142, 243

[56] References Cited

U.S. PATENT DOCUMENTS

| | | | |
|---|---|---|---|
| 3,013,789 | 12/1961 | Sayre | 75/46 |
| 3,411,764 | 11/1968 | Falk et al. | 266/143 |
| 3,434,705 | 3/1969 | Pere | 266/165 |
| 3,477,705 | 11/1969 | Mobley | 266/143 |
| 3,484,088 | 12/1969 | Pere | 266/143 |
| 3,502,313 | 3/1970 | Pastorius | 266/143 |

OTHER PUBLICATIONS

Making, Shaping & Treating of Steel, 9th Ed., US Steel, 1971 pp. 473–497.

Primary Examiner—Peter D. Rosenberg
Attorney, Agent, or Firm—Ralf H. Siegemund

[57] ABSTRACT

A method of making steel in several stages under a reaction slag and accompanied by addition of oxygen carriers involving the moving of a metallurigical vessel along at least one line along which each step of a plurality of metallurigical process steps is carried out.

4 Claims, 3 Drawing Sheets

MAKING OF STEEL

BACKGROUND OF THE INVENTION

The present invention relates to the production of steel and, more particularly, the invention relates to a method and equipment for a multi-stage production of steel and formation of reaction slag, by means of blowing gaseous oxygen into and through the product, the oxygen may be blown directly or applied through oxygen carriers.

The method to which the invention pertains is basically quite different from conventional converter methods which can made variable through a variety of blowing techniques such as top blowing or through blowing from the bottom. Blowing a converter by means of oxygen or through blowing under utilization of inert gases such as argon and nitrogen has as its primary objective the improvement of the overall method of production with side effects of a beneficial nature arising to the equipment, but also for purposes of improving the final product steel. All known variations of the so-called LD process, such as any variation of flushing gas amount, improvement of after-burning of carbon monoxide and carbon dioxide, the guiding of slag, the resulting dephosphorization and desulphurization, the reduction of manganese burnoff and the like, have as a primary objective the improvement of the quality of steel under lower production costs, permitting also varying the scrap content in the converter. All this, however, requires that certain prescribed values and parameters be maintained, including here particularly the quantity of raw material variations of changes are limited and permitted to occur within in very tight limits only. This is particularly required with regard to the existing converter vessel, its capacities and operation of parameters.

Once a converter with blowing equipment has been installed and the installation has been completed, any variation, i.e., any flexible operation for matching the steel production in the converter to any particular requirements is limited to a great degree and requires, even in case of minor variations, considerable expenditures, and still often they can only be unsatisfactorily or incompletely fulfilled. Therefore, the LD process is very inflexible, in spite of the increasing tendency in modern industrial countries concerning the mass production of steel on one hand, and the increased demand for high quality steel on the other hand. These known converters are simply not well suited for that purpose, and they are particularly not well suited for varying the amounts of steel and the particular composition.

Independently from the foregoing, there has to be observed that the method outlined earlier and deviating from the LD method is known from the German patent No. 2,942,779. This particular patent discloses a method for working a particular amount of pig iron, but does not consider a broader scope of raw material which may include or is even exclusively determined by scrap iron.

DESCRIPTION OF THE INVENTION

It is an object of the present invention to optimize the stepwise smelting of steel in constrast with and in distinction to the known converter method, but in a manner which permits a large variety of raw material composition, and which also permits a greater variety in the quality and consistency of the final product.

Therefore, it is a particular method of the present invention to provide a new and improved method for smelting steel in a more flexible method and under appropriately designed equipment, whereby particularly high quality products should be within the scope of production under the lowest possible cost.

In accordance with the preferred embodiment of the present invention it is suggested that smelted raw material is treated by a process carried out as the material is moved from the blast furnace to, for example, a continuous casting machine in a direct line of metallurgical operating steps, and that a metallurgical container is provided for the decarbonization and being sufficiently large so that not only the requisite volume is obtained for operating on the basis of scrap on a consideration of the residual work posed by the inclusion of slag, but is susceptible to accommodate an additional volume portion for gas. Moreover, the conventional converter blowing stand is entirely omitted. This way the steel production is rendered more flexible, particularly in view of any short terms changes in the production quality, and in further view of variation in the desired quality. Moreover, such a multi-step method facilitates greatly the control of the process as a whole. Additional advantages will become more apparent from the following description of variations in production engineering, and the resulting requirements for the requisite equipment.

Certain practical examples are based primarily on different compositions for the raw material, and they dictate the particulars in practicing the invention; but generally speaking they involve similar type steps that vary only quantitatively. By way of example, a raw charge is composed of smelted pig iron amounting to 95 to 99% to which is added a scrap portion amounting to 5 to 1% (all percentages by weight). From the smelted material, the following elements are to be removed in the individual stages: Silicon, manganese, phosphorus, sulphur, carbon, following which the smelt is to be deoxidized, alloyed, reheated, desulphurized, and fine finished, such as particularly alloyed depending on the requirements.

In an alternative case, it should be considered that the raw material may have a oomposition amounting to 5 to 85% pig iron, to which is added 95 to 15% scrap. From the smelt, but in a single metallurgical vessel, the following elements should be removed in individual stages: Silicon, manganese, phosphorus, sulphur, and carbon, following which the smelt is to be deoxidized, alloyed, reheated, desulphurized, and subjected to a fine finish.

Furthermore, it is suggested that in the case of 100% scrap metal as raw material, heat is applied under the addition and burning up of carbon, following which the following elements are removed in the individual stages: Silicon, manganese, phosphorus, sulphur, and carbon, following which the smelt is to be deoxidized, alloyed, reheated, desulphurized and again fine finished.

From the foregoing it can be seen that the raw material varies in proportion but the removing steps are basically similar. In accordance with the inventive method, the following procedure and equipment is suggested: Between the blast furnace and the casting stand of a machine for continuous casting, one provides at least one rail, preferably several in parallel, and at least one transport vehicle runs on the rail, accommodating at least one metallurgical vessel such as steel ladle. This vessel is constructed to have a volume which corresponds to the steel volume plus a gas volume at maximum refining speed. The equipment does not include a conventional converter blowing stand. Aside from this advantageous omission the invention permits the use of vessels of very simple construction. Such vessels have the advantage that they can be quickly exchanged and the subordinate steps such as refinishing the brick lining and the like can be conducted quite easily. The entire steel production equipment is considerably reduced as compared with conventional equipment, and this reduction encompasses the pig iron portion of the system. Therefore, capital expenditure is reduced. Moreover, cost and energy consumption is considerably reduced on account of the stepwise steel production. Any saving of capital expenditure is in addition to the aforementioned features which are instrumental in reducing the cost of converting raw material to a finer product.

As will be illustrated below, the individual components are easier accessible, and the overall equipment is easier to be looked over and supervised. This particularly is a result from the fact that along the rail or rails extending between the blast furnace and a machine for continuous casting, the individual refining stages for selective operation are identified through a limited number of accessories such as the liftable and lowerable oxygen blowing lance, a feeder device (or several thereof), vacuum equipment and the like. Also, these pieces of auxiliary equipment are arranged in the requisite level. All of them cooperate with the content of the same vessel that passes on the carriage along these process stations.

The minimum dimensions of the steel production vessel as compared with a conventional steel converter is advantageously derived from the fact that the gas volume to be accommodated in addition to the steel volume within the vessel such as the ladle is determined in accordance with the maximum value of the junction given by $dCO/dt = f(v)$. Thus the vessel to be used in accordance with the invention has a certain maximum value, but a variety of different vessels can still be used so that in cases one may simply exchange the vessel is transported on the rail is a smaller one.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Figure 2:
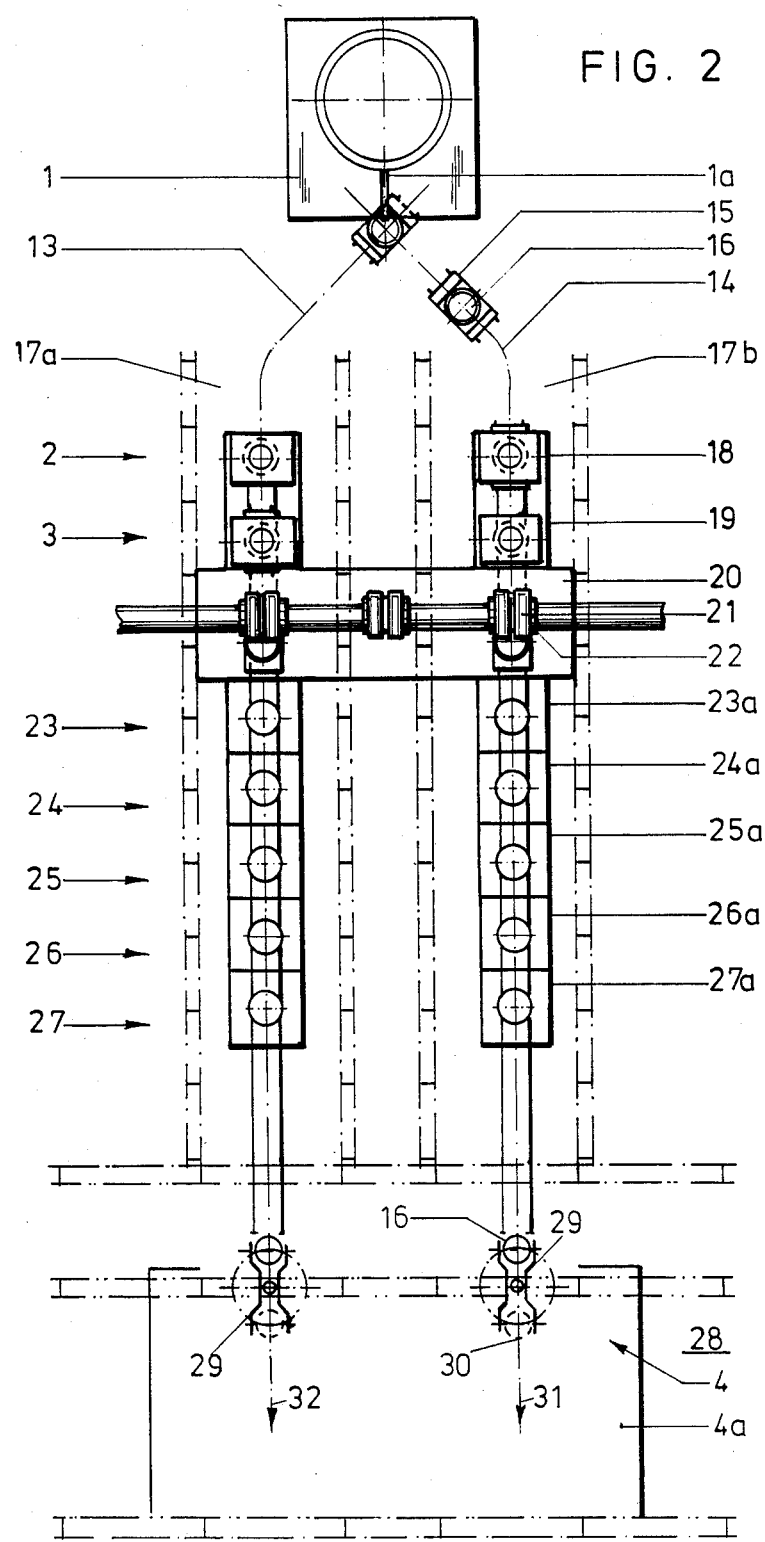
FIG. 2 is an elevational view of the device and equipment by means of which the method shown in FIG. 1 is being practiced.
Figure 3:
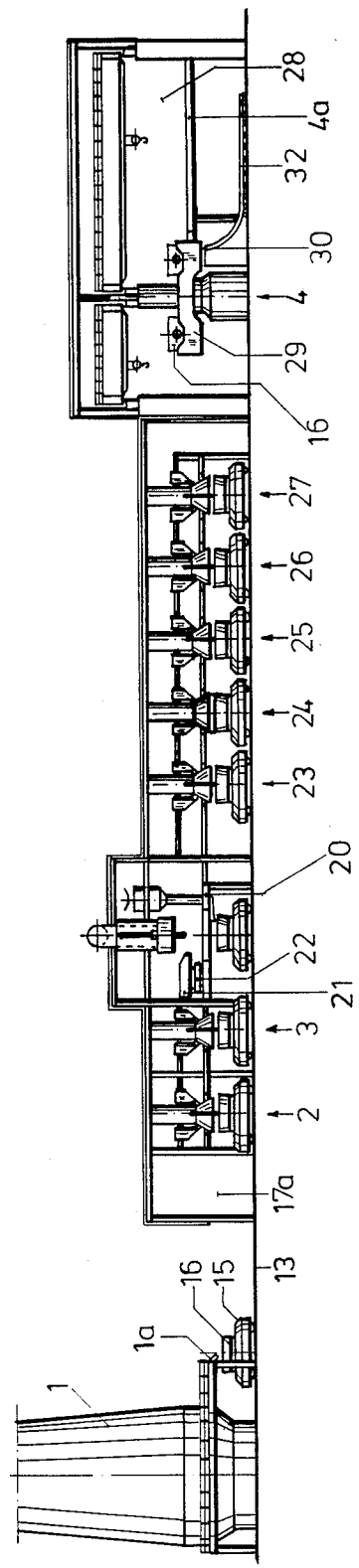
FIG. 3 is a section view as indicated in FIG. 2.

Proceeding now to the detailed description of the drawings, reference is made first to FIGS. 2 and 3. A blast furnace 1 is provided so to speak on one end of the production line, and a machine for continuous casting 4 is situated at the other end. Two tracks of rails 13 and 14 run from the blast furnace 1 to the casting machine. A discharge facility (tap) 1a from the blast furnace is suitably extended therefrom so that steel can be charged from the top into a metallurgical vessel 16 which is mounted on a transport vehicle or carraige 15 designed for running on the rails. Near the blast furnace 1 there is provided a suitable switch where the track 13 and 14 merge permitting the vessel and the vehicle 15 to run on one or the other of the tracks depending upon the particular operating sequence to be undertaken with regard to the content of the vessel 16. The tracks 13 and 14 run from the furnace 1 to the casting stand 4a of a set of casting facilities for continuous casting.

The vessel 16 is mounted on the vehicle 15 which runs on the tracks as stated, and the vessel 16 may be a metallurgical vessel generally or a ladle or the like. The volume of the steel to be produced together with the gas volume of a particular assumed size of the speed determines the gross volume of the vessel 16 so that upon reverse calculating a piece of existing equipment, any existing vessel 16 can be inspected with regard to their capacity under consideration of that aspect. Therefore, one can say that a relatively large inventory of metallurgical vessels 16 is available for practicing the invention, one simply has to determine how much a particular vessel may be capable of containing molten metal under consideration of the requisite gas volume. This in turn means that for practicing the invention it is not necessary in general to provide particular vessels which are structurally adapted for the inventive purpose.

The discharge spout or tap channel 1a feeds molten pig iron into the metallurgical vessel 16, whereupon the vessel is moved on to the carriage into one of the enclosed production ines 17a or 17b containing the various pieces of equipment and in stages for treating the steel. It can readily be seen that the several stations are aligned transversely to the extension of the track. Therefore, stage 2 includes along either track a piece of equipment for the removal of silicon and manganese. Stage 3 includes the two stations 19 for pre- or coarse dephosphorization and/or desulphurization. If scrap is to be added, a particular delivery and charge stage 20 is provided having tiltable, scrap containing containers 21 and a scrap feed crane 22, so that scrap can be added at that point and at a requisite amount to the particular vessel 16 underneath.

The stages 23 include a feeder portion 23a for each of the tracks, and provides for a process to obtain the desired phosphorus content. The next set of stations 24 includes the stages 24a for degassing such as deoxidizing the alloy under utilization of appropriate vacuum equipment. In the stages 25 the temperature is increased through blowing of oxygen, and for this a blow lance equipment 25a is provided on each of the tracks After the vessel 16 on the carriage 15 is moved again it will arrive at a desulphuring agency adding equipment 26a for fine desulphurization so as to obtain the requisite low final sulphur content. This occurs in the set of stages 26. Finally, and depending upon the quality of the steel, a set of stages 27 provided in which depending upon the particular conditions suitable equipment 27a will provide a fine treatment such as alloying to meet particular requirements.

Immediately thereafter a crane in the equipment pertaining to and being mounted as part of the equipment in a hall 28 is used to place the metallurgical vessel 16 into a revolving or turning tower 29. The vessel will now be turned by 180° through this tower to obtain a casting position 30, above one or the other of the two casting lines 31 or 32.

Figure 1:
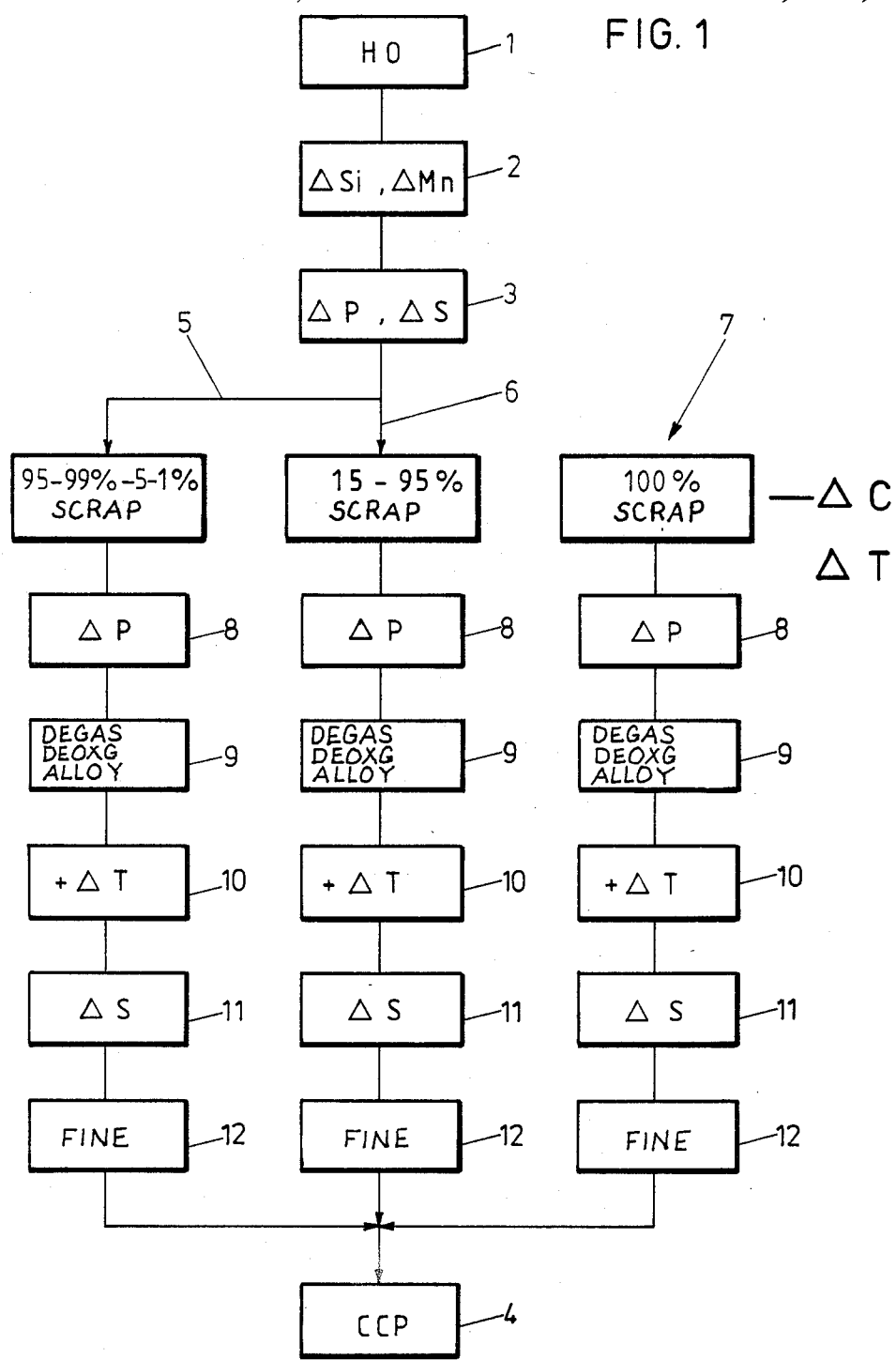
FIG. 1 is a process diagram for illustrating the individual stages and steps for making steel in accordance with the preferred embodiment of the invention for practicing the best mode thereof, the process begins with discharge of steel from a blast furnace until feeding to a machine for continuous casting.

It can thus be seen, and turning to FIG. 1, that the inventive equipment under utilization of a single facility being comprised of a carriage with a metallurigical vessel (15, 16) is provided for making steel in accordance with one of several procedures delineated schematically in FIG. 1. Beginning with the furnace 1, in a first step 2 silicon or manganese is removed, and in a second stage 3 phosphorus and/or sulphur is removed, whereby these two stages can be considered preparatory for the subsequent operation which provides a relative amount of scrap iron to be added to the pig iron that was extracted from the furnace 1. Basically three lines of procedure can be followed, two of which begin with pig iron extracted from the furnace 1 while the third line uses exclusively scrap. In this case the vessel will begin the process with stages 23. Any of the tracks 13 and 14 in FIG. 2 can be used here, but tract 14 is preferred because this process line is already designed for a high scrap content.

In the first direct line 5 it is assumed that the steel to be processed contains from 95 to 99% pig iron from the furnace 1, and now in the stage 20 (FIG. 2) scrap is added at a relative amount from 5 to 1%. The material is now dephosphorized as per step 8 (stage 23), degassed and deoxidized and alloyed as per step 9, temperature controlled through an intermediate heating step 10 following which a desulphurization step 11 is provided, and the process is terminated with a fine treatment step 12, whereupon the content of the vessel 16 is discharged into the machine for continuous casting 4.

As was outlined with reference to FIG. 2, a changeover to a different raw material basis is simply obtained by moving from track 13 to track 14. This then gives rise to the second path 6 in the flow chart diagram of FIG. 1. It is assumed that the pig iron content may vary within the range from 5 to 85% so that from 95% to 15% scrap is added in the stage 20. Thereafter, the steps 8, 9, 10, 11 and 12 are carried out as aforedescribed.

Finally, the system can be easily switched to work with 100% scrap, and the procedure is carried out as per branch 7 in FIG. 1. In this case the requisite process heat delta T is obtained through the addition of carbon identified symbolically through delta C. Thereafter, the procedure follows the same line of steps 8 through 12 as aforedescribed.

It is readily seen that the changeover from one alternative to the other is basically different from procedure which has to be followed in a blowing converter equipment.

The invention is not limited to the embodiments described above, but all changes and modifications thereof not constituting departures from the spirit and scope of the invention are intended to be included.

We claim:

1. Method for the making of steel in several stages under formation of reaction slag and under blowing gaseous oxygen or under addition of oxygen carriers comprising:

the step of moving a metallurgical vessel along at least one line along which each step of a plurality of metallurgical process steps is carried out, step-by-step for all steps of the plurality; and selecting the metallurgical vessel for the decarbonization, the vessel to have a volume in accordance with the volume requirement for steel to be made and (i) depending upon the residual slag work, (ii) supplemented by a residual volume to accommodate development of gas as it develops during at least one of the process steps and being determined in accordance with a maximum value of a time derivative function of the carbon monoide content.

2. Method as in claim 1 wherein said sequential treatment steps are comprised of steps for sequentially removing silicon, manganese, phosphorus, sulphur and carbon, followed by deoxidation, alloying, reheating, desulphurization and final refining treatment.

3. Method as in claim 1, said steps being preceded by a charging step of a metallurgical vessel with pig iron to which scrap is added following the desulphurization, and being succeeded by a step of charging a machine for continuous casting directly with the steel as made.

4. Method as in claim 3 wherein said steps are carried out along different lines depending upon the scrap content.

* * * * *